United States Patent [19]
Miller et al.

[11] 3,708,685
[45] Jan. 2, 1973

[54] HIGH INDUCTIVE LOAD ENERGIZING CIRCUIT
[75] Inventors: Joseph G. Miller, Madison; John H. Stichman, Verona; Theodore Bernstein, Madison, all of Wis.
[73] Assignees: Joseph G. Miller; Marvin Evans; David H. Miller, ; part interest to each
[22] Filed: June 1, 1971
[21] Appl. No.: 148,491

[52] U.S. Cl............307/104, 317/DIG. 6, 317/33 SC, 321/45 C, 307/146
[51] Int. Cl.................................................H02j 1/00
[58] Field of Search........317/DIG. 6, 148 SB, 33 SC; 307/104, 127, 146, 252 J, 252 M; 321/45 C, 45 ER; 318/492, 138, 139, 439

[56] References Cited

UNITED STATES PATENTS

| | | | |
|---|---|---|---|
| 3,560,817 | 2/1971 | Amato | 317/DIG. 6 |
| 3,238,418 | 3/1966 | Heft | 307/252 M |
| 3,293,495 | 12/1966 | Smith | 317/DIG. 6 |
| 3,132,287 | 5/1964 | Yarbrough | 317/33 SC |
| 3,423,665 | 1/1969 | Greenberg | 321/18 |

*Primary Examiner*—William M. Shoop, Jr.
*Assistant Examiner*—Harvey Fendelman
*Attorney*—Andrus, Sceales, Starke & Sawall

[57] ABSTRACT

A lifting magnet is connected to a D.C. supply by a pair of silicon-controlled load rectifiers. A manual double-pole, three position, center-off start switch connects the anode to the gate of the respective controlled rectifiers. Commutating networks are connected in parallel with the magnet and rectifiers, each network consisting of a commutating capacitor in series with a resistance element and controlled rectifiers connected across the load rectifiers and associated commutating capacitor. The switch similarly connects the respective commutating rectifiers for actuation to discharge the commutating capacitor in a reverse direction through the controlled rectifiers to positively drive the main load rectifier off. The magnet is connected back to the source through a pair of oppositely polarized discharging diodes or to a parallel span branch including a normally back-biased diode and variable resistor. The inductive energy in the magnet is discharged through the span branch or back into the source upon turn-off of the load rectifiers. A discharge current detection and reversing control circuit controls a similar reverse current circuit having load rectifiers and commutating rectifiers connected in circuit with the magnet and commutating capacitors. The control circuit provides for automatic sequential firing of forward commutation and reverse current circuits.

19 Claims, 2 Drawing Figures

FIG_1

FIG_2

INVENTORS
JOSEPH G. MILLER
JOHN H. STICHMAN
THEODORE BERNSTEIN
BY
Andrus, Sceales, Starke & Sawall
Attorneys

HIGH INDUCTIVE LOAD ENERGIZING CIRCUIT

BACKGROUND OF INVENTION

This invention relates to an inductive-load operating circuit and particularly to an operating circuit for energizing and de-energizing of a highly inductive load such as a lifting magnet, a motor and the like.

Energizing of highly inductive loads from a direct current source presents particular problems in the opening of the circuit because of the high-induced voltages in the load winding upon de-energizing of the inductive load. This is particularly true where a very rapid de-energization of the load is desired and tends to generate a relatively large induced voltage in the load tending to maintain the current flow. The problem becomes particularly severe when solid state switching units are employed such as silicon-controlled rectifiers to make and break the power circuit wherein the inductive load tends to maintain the current path through the switching rectifiers and thereby prevents rapid de-energization of the load as well as applying of relatively high voltages to the solid state units.

SUMMARY OF INVENTION

The present invention is particularly directed to the energizing of a highly inductive load such as a lifting magnet or the like from a direct current source through solid state unidirectional load switch means such as silicon-controlled rectifiers and, in particular, to a highly improved control circuit for turning off such a switch means through a capacitor commutating network or circuit means, and further, to an improved means of providing for controlled discharge of the inductive energy stored in the inductive load. Generally, in accordance with the present invention, the load is connected to the power supply in series with a pair of silicon-controlled rectifiers or other similar triggered or gated switching devices, one to each side of the load. A start switch means connects the turn-on or gate circuits to the input supply; for example, by connecting the anode to the gate of the respective controlled rectifiers. Momentary closure of the switch results in application of a relatively large turn-on voltage to the controlled rectifiers or the like in series with the load. As soon as the switching devices turn on, they establish a relatively low impedance path thereby bypassing the starting circuit. Further, the controlled rectifiers maintain conduction after opening of the gate circuits as long as the current through the main or power path is above the holding current level, in accordance with the well known operation. A pair of commutating networks are connected in parallel with the output circuit connection means to the load circuit, each consisting of a commutating capacitor as an energy storage means in series with a resistance element. Commutating controlled rectifiers or other triggered commutating switch means are connected across the main load controlled rectifiers and the associated commutating capacitor. A turn-off or stop switch means connects the turn-on or gate circuits of the commutating rectifiers to the power supply and/or the commutating capacitors such that closure of the corresponding switch means results in turn-on of the commutating rectifiers and discharge of the commutating capacitor in a reverse direction through the controlled rectifiers to positively drive the main load rectifier off. This also discharges the commutating capacitors and resets the commutating circuit.

In accordance with a further and particularly novel aspect of the present invention, the load is connected back to the current source through a pair of oppositely polarized discharging diodes. When the load rectifiers are turned off, the inductive energy in the magnet is discharged back into the source. This essentially limits the voltage to which the energy across the load will rise.

In accordance with a further aspect of the present invention, a diode in series with a resistance, which is preferably variable, can be connected in parallel with the load to insert a variable decay time. The diode is back-biased with power applied and forward-biased by the induced voltage in the load. A very low resistance in the parallel decay control circuit establishes slow decay of the induced voltage with a low induced voltage level. As the resistance is increased, the decay time decreases but the induced voltage level increases. Further, in the combined circuitry, the level of the setting of the resistance will determine that part of the energy returned to the current source. Thus, the output voltage must rise above the level of the current source which back-biases the discharging diodes. Thus, until the induced voltage rises above the level of the source voltage plus the drop across the discharging diodes, all of the energy is dissipated in the paralleled variable decay time resistor. As soon as the voltage rises above such level, however, the discharging diodes will conduct current from the load winding and thereby return a portion of the stored energy to the source.

In accordance with another aspect of the present invention, when a direct current generator is employed as the power source, a capacitor is preferably connected directly across the output circuit of the generator. The inductive characteristic of the generator will tend to provide high voltage spikes. The capacitor provides the usual protection against such transient voltage signals.

A positive reverse current through the lifting magnet or similar load with means for controlling the relative amplitude or amount of such reverse current either manually or automatically may be provided in accordance with a further novel aspect of this invention. The establishment of the reverse current is responsive to a signal created by the transient voltage developed upon opening of the lifting current circuit, with a sequencing and reversing control circuit completing the reverse current path and subsequently terminating such reverse current path.

The reverse current path is established by oppositely connected controlled rectifiers or similar triggered means. The transient energy discharge circuit includes means for sensing the opening of the forward current path on both sides of the load, and actuates a switching circuit to then gate on the reverse current rectifiers. The reverse current rectifiers do not fire till discharge is completed. The commutating capacitors are reverse charged by first the load discharge current and then the reverse current and connected by second commutating rectifiers across the reverse current rectifiers. The reversing control circuit may include timing or current level detection means to fire the latter rectifiers and thereby terminate the reverse current flow. Oppositely polarized diodes or the like, provide for discharging of the inductive energy stored in the magnet by the reverse current.

In a particularly practical circuit, the forward current related transient voltage circuit includes sensing resistors to the opposite sides of the load. Relay means are paralleled with the resistors. Relay contacts are series connected in the control circuit which includes a first reverse current relay and a second reverse current commutating relay. The contacts of the relays are interconnected to conjointly control the firing of the reverse current controlled rectifiers and the reverse current commutating controlled rectifiers. The control circuit includes a first resettable switching means connected to energize the first relay and to actuate a timing or subsequent second switching circuit to de-energize the first relay and energize the second relay for a selected time. The first switching means may be a flip-flop circuit and the second switching circuit a level detection comparator circuit having either a capacitive timing network connected between the flip-flop circuit and the comparator circuit or a current level through load. The second relay is connected to the output of the comparator circuit for energization and the flip-flop circuit is connected to be reset by the output of the comparator circuit and thereby provide a controlled sequential energization of the load.

BRIEF DESCRIPTION OF DRAWINGS

The drawings furnished herewith illustrate the best mode presently contemplated by the inventor for carrying out the subject invention and clearly discloses the above advantages and features as well as others which will be readily understood from the following description of the illustrated embodiment.

In the drawings:

FIG. 2 is a schematic circuit diagram showing a forward and reverse current energizing circuit for a magnet or the like.

DESCRIPTION OF THE ILLUSTRATED EMBODIMENT

Figure 1:
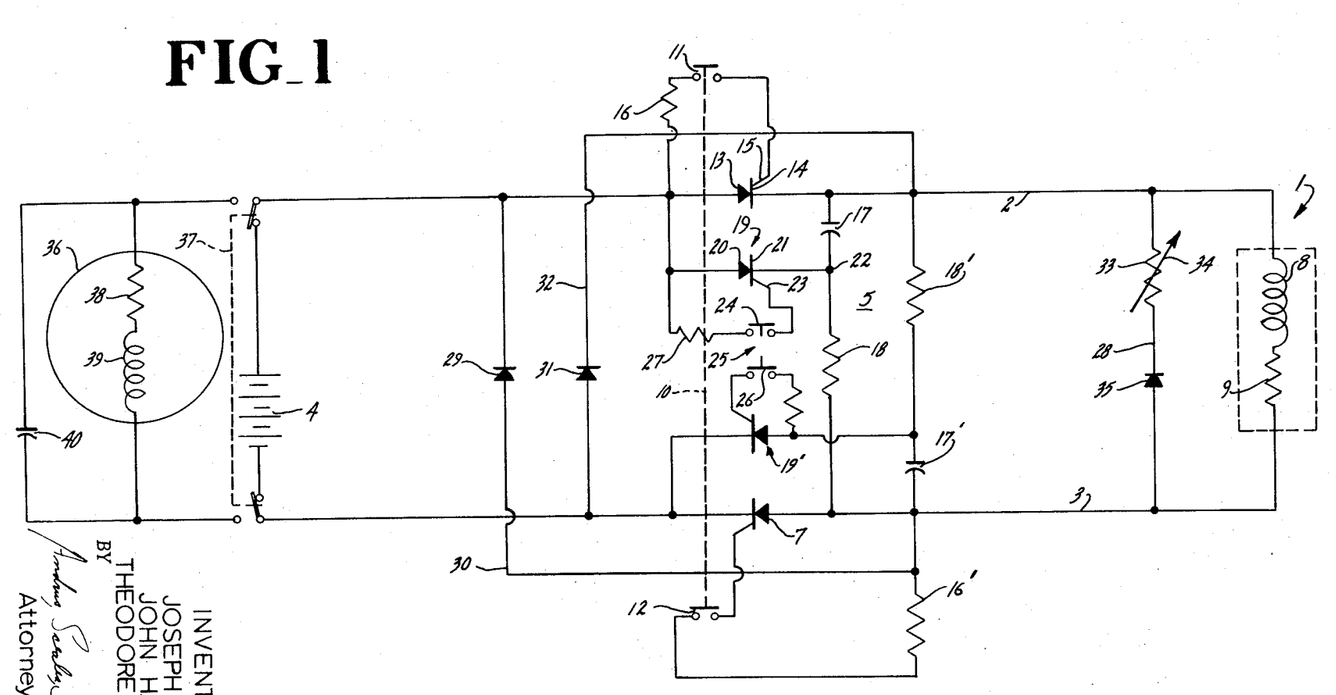
FIG. 1 is a schematic circuit diagram showing the present invention applied to a highly inductive load such as a lifting magnet and energized from a suitable direct current source.

Referring particularly to the drawings and particularly to FIG. 1, the present invention is shown applied to a lifting magnet 1 which is typical of a highly inductive load to which the present invention is particularly adapted. The lifting magnet 1 is connected to a pair of direct current power leads 2 and 3. In the illustrated embodiment of the invention, a direct current power source is diagrammatically shown as a battery 4 with the output connected to the leads 2 and 3 in series with similar silicon-controlled rectifiers 6 and 7 which, in the usual manner, maintain the circuit open until fired and then essentially provide a minimal impedance between the generator 4 and the lifting magnet 1.

In the illustrated embodiment of the invention, the lifting magnet 1 is also shown schematically as separately including an inductive or coil portion 8 in series with a resistance portion 9. It will be recognized that in an actual construction, the illustrated inductance and resistance is part of a single coil or winding. The controlled rectifiers 6 and 7 are selectively triggered to conduct by a common start switch 10 having a first set of contacts 11 connected in the firing or turn-on circuit of the rectifier 6 and a second set of contacts 12 similarly connected in the turn-on circuit of the rectifier 7. As the turn-on and turn-off circuits for the rectifiers 6 and 7 are essentially the same in the illustrated embodiment of the invention, the circuitry associated with the rectifier 6 is described in detail with the corresponding elements of the rectifier 7 identified by similar primed numbers.

The controlled rectifier 6 is shown in the conventional manner including an anode 13 connected to the positive output terminal or side of the DC source 4. A cathode 14 of rectifier 6 is connected to the positive lead 2 and corresponding side of the lifting magnet 1. The rectifier 6 includes a gate 15 connected in series with the contacts 11 and a small current-limiting resistor 16 to the positive side of the source 4 in common with the anode 13. Upon closure of the contacts 11, current will flow through the resistor 16 and contacts 11, the gate 15 and cathode 14 and finally to and through the lifting magnet 1 to the DC line 3.

The rectifier 7, as previously noted, is similarly constructed and its gate circuit is interconnected into the power circuit through the switch 12 and a resistor 16'. The resistor 16', however, is connected to the power lead 3 which is normally the negative lead after turning on of the rectifier 7. However, before turn-on of the rectifier 7, the latter presents an open circuit to the current source 4 and, consequently, upon initial conduction, the current flow is from the lead 3 through the resistor 16', switch 12, gate 15', cathode 14' to the negative side of the current source 4. Consequently, upon closing of the switch 10, the above current path simultaneously drives the rectifiers 6 and 7 on. The current path from the direct current source 4 is then directly through the anode-to-cathode circuit of the rectifier 6, the lifting magnet 1 and the anode-to-cathode circuit of the rectifier 7 to the direct current source 4. Thus, upon initiation of the current or the turn-on of the rectifier 6 and 7, the impedance of the anode-to-cathode circuit drops to an essentially minimal amount and the current flow, taking the least impedance flow path, bypasses the gate circuit between the source 4 and the lifting magnet 1. As a result, the lifting magnet 1 is energized to establish the desired electromagnetic field for lifting of any suitable load depending upon the particular design of the system. Thus, the present invention is particularly adapted for high-inductive loads such as high-powered, direct current lifting magnets employed in moving of large metal objects such as motor vehicles and the like encountered in the usual vehicle scrap yard, wherein the vehicles may be lifted within the yard for one reason or another.

The controlled rectifiers 6 and 7 are turned off by reducing the anode-to-cathode circuit below the holding current level and/or applying a reverse turn-off voltage across the anode-to-cathode circuits. In accordance with the present invention, a turn-off or commutating capacitor 17 is connected in series with a resistor 18 in parallel with the magnet 1 and thus across the load side of the rectifiers 6 and 7. The capacitor 17 is connected directly to the cathode of the rectifier 6 and the resistor is connected to the anode 13 of the rectifier 7. Thus, after turn-on of the controlled rectifiers 6 and 7, the capacitor 17 will charge through the resistor 18 to the supply voltage of source 4. Generally, the resistor 18 is of a relatively high-resistance value to minimize the current flow through the circuit. Although this introduces a relatively long time constant into the timing period for charging of the capacitor 17 to the level of the supply voltage, the on-time of the load 1 is generally much longer than such a time constant. Consequently, the circuit will operate as hereinafter described. A commutating control rectifier 19 is connected across the rectifier 6 and the capacitor 17 and, in particular, with the anode 20 of the rectifier 19 connected to the positive side of the source 4 and the cathode 21 of the rectifier 19 connected to the junction 22 of the capacitor 17 and the resistor 18. The rectifier 7 is similarly controlled by a commutating network including a capacitor 17' and resistor 18' connected to control a rectifier 19'.

The gates 23 and 23' of the rectifiers 19 and 19' are simultaneously controlled by a drop or turn-off switch 24. Thus, the switch 24 includes a first set of contacts 25 connected to the gate 23 and a second set of contacts 26 connected to the gate 23'. The gate 23 is connected in series with the contacts 25 and a resistor 27 to the anode 20 of the rectifier 19. Similarly, the gate 23' is connected in series with the drop contacts 26 and a resistor 27' to the anode 20' of the rectifier 19'. The anode 20' of the rectifier 19' is similarly connected to the positive side of the capacitor 17' and particularly the junction 22' of the capacitor 17' and the resistor 18'.

When it is desired to de-energize the lifting magnet 1, the switch 24 is closed. This simultaneously closes the contacts 25 and 26. The closing of the contacts 25 provides a current path from the positive side of the source 4 through the resistor 27 and contacts 25, gate 23, cathode 21 of the rectifier 19, junction 22, resistor 18 and rectifier 7 to the negative side of the power supply, thereby establishing a turn-on current to the rectifier 19. Similarly and simultaneously, turn-on current is supplied through the contacts 26 and switch 24 from the positive side of the source 4 through the rectifier 6 to line 2 through resistor 18' and junction 22', resistor 27', contacts 26, the gate 23' of the rectifier 19' and associated cathode directly back to the negative side of the source 4. Thus, the rectifiers 19 and 19' are simultaneously turned on. Effectively, this drops the voltage of anode 13 of rectifier 6 to the negative voltage of the capacitor 17 which provides a discharge path for the capacitor 17, opposing the holding current and effectively discharging the capacitor 17 to turn off the rectifier 6. Similarly, turn-on of the rectifier 19' provides a discharge path for the capacitor 17' through the rectifier 7, opposing its holding current and effectively turning off the rectifier 7.

Thus, the circuit to the magnet 1 is thereby essentially opened. As is well known, the inductive characteristic of the magnet establishes an induced voltage of an opposite polarity tending to maintain current flow in the original lifting energization direction. Thus, in the illustrated embodiment of the invention, the lower end of the winding 8 becomes positive and tends to maintain the current flowing in the circuit in the original direction. This, of course, tends to prevent turn-off of the rectifiers and, furthermore, if the circuit is turned off, requires dissipating of the energy in a manner to limit the voltage generated across the lifting magnet 1 in order to prevent destructive internal stresses within the winding 8. In the illustrated embodiment of the invention, the energy is selectively fed back to the source 4 or a special dissipating branch circuit 28 as follows. A first discharging diode 29 is connected in a line 30 between the DC load line 3 and the positive side of the source 4. Similarly, a second discharging diode 31 is connected in a lead 32 between the normally positive DC load lead 2 and the negative side of the current source 4. Diodes 29 and 31 are connected to leads 2 and 3 and to source 4 so as to be back-biased with rectifiers 6 and 7 conducting to energize magnet 1 from source 4. When the lifting magnet circuit is opened and the lifting magnet 1 tends to maintain the current, it becomes a current source of the opposite polarity and is applied in the direction to forward-bias the diodes 29 and 31. Thus, the lower end of the lifting magnet 1 is positive and tends to drive current through the lead 3 and diode 29 to the positive side of the source 4 with the return path through the source 4 and diode 31, lead 29 and the normally positive lead 2 to the now-negative side of the winding 8 of magnet 1. As the winding 8 acts as a current source, the voltage generated across the lifting magnet 1 is essentially limited to the voltage of the source 4 and thereby prevents creation of damaging voltages within the lifting magnet.

In the illustrated embodiment of the invention, the alternative parallel path 28 is provided directly across the lifting magnet, including an adjustable resistor 33 as shown diagrammatically by the control arrow 34. The resistor 33 is connected in series with a normally blocking diode 35 directly across and, therefore, in parallel with the lifting magnet 1. Thus, when the lifting magnet 1 becomes a source of current as a result of the opening of the energizing circuit from the current source, the diode is forward-biased because of the anode connection to the lower end of the lifting magnet winding 8 through the resistor 9. As a result, the magnet 1 will tend to discharge through the circuit of the diode 35 and resistor 33. If the resistor is at a low value of resistance, the energy in the winding 8 of magnet 1 will tend to discharge through the parallel circuit. As the resistance is increased, the voltage will tend to build up in the magnet and will give a more rapid decay. Thus, the adjustment of the resistor 6 provides a variable decay time and spans out the discharge time of the energy dissipation. Further, when employed in combination with the current feedback to the power source 4, the setting of the resistor 33 will determine when and if energy is transmitted to the source 4. Thus, the resistor 33 must be selected to permit a voltage buildup which is greater than the voltage of the current source plus the voltage drop across the diodes 29 and 31. Only then can the lifting magnet become a current source with a voltage sufficient to drive current back into the source 4.

The capacitors 17 and 17' may also be reverse-charged and subsequently discharge in the reverse direction through the winding 8 of magnet 1 and thereby tend to reset the magnetic core.

As previously noted, the DC current source 4 can be of any desired construction and is shown in the above circuit as a battery. Alternatively, the power source 4 may be a direct current generator 36 which, for purposes of description, is shown in the drawing to selectively replace battery 4.

For simplicity of illustration, a two-pole double-throw switch 37 is shown selectively connecting the generator 36 and the battery 4 as the input into the circuit. Normally, the system will be employed and constructed with a single power source connected as the input.

The generator 36 is diagrammatically shown in series with a rotor resistance 38 and a winding 39 connected in series. The inductance of winding 39 of the rotor might generate a damaging spike signal across the input or the output lines. It is, therefore, advisable to interconnect a relatively large transient-protecting capacitor 40 directly across the terminals of the DC generator 36.

With either current source, the circuit basically operates in the same manner which is summarized as follows. In standby position, the lifting magnet 1 is de-energized and any stored energy due to a previous cycle has been discharged through the branch network including the dissipating resistor 33.

When the switch 10 is actuated to close the contacts 11 and 12, the rectifiers 6 and 7 are driven on through the circuit of the resistors 16 and 16' and the load 1. This will provide a relatively hard drive-on current pulse and, therefore, positively drive on the rectifiers 6 and 7 in the normal desired manner. When the rectifiers 6 and 7 conduct, they provide a very low impedance path across the circuit of the gates 15 and 15' until the contacts 11 and 12 are open. The lifting magnet 1 is now energized directly from the current source 4. Simultaneously, the capacitors 17 and 17' are charged to the source voltage in parallel with the lifting magnet 1. Further, although the time constant is relatively long, as previously noted, the time constant is, nevertheless, substantially less than the time period that the magnet 1 is energized.

When it is desired to de-energize the lifting magnet, the switch 24 is actuated to close the contacts 25 and 26. This provides a bypass circuit providing current to the gate-to-cathode circuit of rectifiers 19 and 19', driving them into conduction and thereby removing power from the lifting magnet 1 by discharging of the capacitors 17 and 17' to turn off the rectifiers 6 and 7. When the rectifiers 6 and 7 turn off, the lifting magnet 1 acts as a current source to dissipate its energy through the diodes 29 and 31 to the source 4 and/or through the variable span resistor 33. This also provides a reverse bias across the network of the capacitors 17 and 17' and the rectifiers 19 and 19' to insure turn-off thereof, thereby resetting the circuit after the dissipation of the energy of the lifting magnet 1.

Although the circuit of FIG. 1 provides a system for proper energization and deenergization of the lifting magnets or the like the circuit will provide only for control of the positive lifting current level of the controlled discharge of the stored energy. In many cases it is desirable to provide a positive reverse current through the lifting magnet or similar load with means for controlling the relative amplitude or amount of such reverse current either manually or automatically. A satisfactory application for a highly inductive load such as a lifting magnet with an automatic reverse current control is illustrated in the embodiment of the invention shown in FIG. 2. As more fully developed hereinafter the establishment of the reverse current is responsive to a signal to open the lifting current circuit such as shown in FIG. 1 with an automatic sensing and sequencing circuit to establish the reverse current and subsequently to terminate such reverse current.

Figure 2:
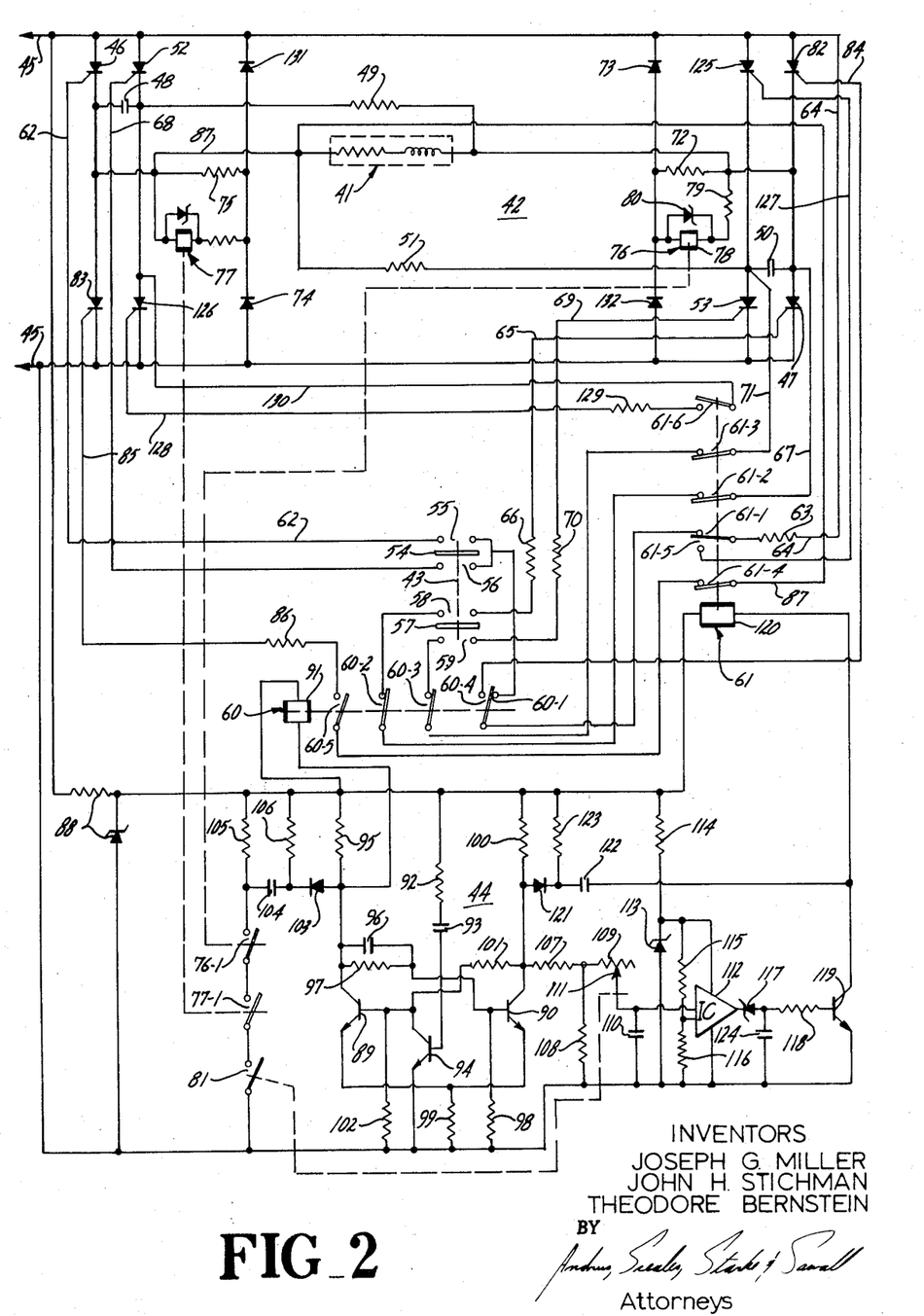

In FIG. 2, a lifting magnet is diagrammatically illustrated at 41 and is connected into an energizing circuit 42 with the several branch circuits of the energizing circuit 42 controlled by a lift-drop switch 43 and an interlocking reversing control circuit 44. The switch 43 is diagrammatically shown as a three position and manually actuated switch which is selectively positioned between a neutral off position, as shown in full line illustration, an upward lift position and a downward drop position to provide for corresponding forward or forward reverse current through the lifting magnet 41. The reversing control circuit 44 is selectively interconnected into the circuit to permit the automatic establishment of a reverse current through the magnet when the switch 43 is moved to the drop position.

The lifting circuit 42 is energized from a suitable current source, not shown, through the main power leads 45. As in FIG. 1, the opposite sides of the lifting magnet 41 are connected to the power leads 45 through series connected silicon controlled rectifiers 46 and 47. Further, a commutating capacitor 48 in series with a resistor 49 is connected in parallel with the lifting magnet 41, with one side of the capacitor 48 connected directly to the cathode of the controlled rectifier 46. A similar commutating capacitor 50 in series with a resistor 51 is connected across the lifting magnet 41 with one side of the capacitor 50 connected directly to the anode of the controlled rectifier 47.

Thus, with the controlled rectifiers 46 and 47 conducting, the lifting magnet 41 is energized with a forward lift current and simultaneously the capacitors 48 and 50 are charged with corresponding polarity in accordance with the connection to the supply leads 45. A commutating controlled rectifier 52 is connected in parallel with the control rectifier 46 and capacitor 48. A commutating rectifier 53 is similarly connected in parallel with the capacitor 50 and the control rectifier 47. The controlled rectifiers 52 and 53 are selectively fired by moving of the switch 43 to the drop position to positively commutate the controlled rectifiers 46 and 47 in the same manner as illustrated with respect to FIG. 1.

The several controlled rectifiers are actuated by the positioning of the switch 43 as follows.

The switch 43 is shown as a double-pole, double throw relay having a neutral position or off position as well as a lift position and a drop position. The switch 43 includes a first common pole 54 selectively engaging a set of lift contacts 55 for firing of controlled rectifier 46 and a related pair of drop contacts 56 connected to fire the commutating controlled rectifier 52. A second common pole 57 which is ganged with the pole 54 selectively engages a first set of lift contacts 58 which is connected to fire the controlled rectifier 47 in synchronism with the rectifier 46. In the alternate or drop position, the common pole 57 engages a second set of drop contacts 59 which are connected to fire the commutating controlled rectifier 53, as is more fully developed hereinafter.

The several contacts of the switch 43 are selectively connected through an interlocking circuit by the contact of a pair of relays 60 and 61 to positively insure a proper condition of the several controlled rectifiers and polarity applied to the several components of the circuit to minimize possible damaging voltages from being applied to the several power components of the circuit 42. The relays 60 and 61 as well as the other relays described herein have their windings separately identified in connection with the description thereof in circuit, with the several contacts identified by the relay number and an additional dashed number for purposes of simplicity and clarity of explanation. Thus, the relay 60 includes a first set of normally closed contacts 60-1 which are connected in series with the contacts 55 of switch 43 to a gate lead 62 to the gate of the controlled rectifier 46. The opposite side of the contacts 60-1 are connected directly to a set of normally closed contacts 61-1 of the relay 61. A limiting resistor 63 is connected to the contacts 61-1 and via a lead 64 to the positive side of the incoming power supply 45. Thus, with the contacts 60-1 and 61-1 in the closed position the closing of the switch contacts 55 directly provides a positive power supply to the gate of the controlled rectifier 46 thereby conditioning it to conduct and provide a positive voltage to the corresponding side of the lifting magnet 41.

The gate lead 65 of the controlled rectifier 47 is connected in series with a resistor 66 to the lift contacts 58 associated with the common pole 57 of the switch 43. The switch 58 is connected in series with a set for normally closed contacts 60-2 of the relay 60 and a set of normally closed contacts 61-2 of the relay 61. A lead 67 directly connects the normally closed contacts 61-2 to the anode side of the controlled rectifier 47. The gate of the controlled rectifier 47 is thus connected directly to the anode which in turn is connected to a relatively positive potential thereby establishing a turn on signal to the controlled rectifier. Thus, with the switch 43 latched in the lift position, current is supplied from the positive side of the power lines 45 through the controlled rectifier 46 to the lifting magnet and to the parallel circuits of the commutating capacitors 48 and 50 returning to the negative side of the power lines 45 via the controlled rectifier 47. The lifting magnet 41 is thus energized with a forward lift current and simultaneously the capacitors 48 and 50 are charged to line voltage with the corresponding polarity.

Moving the switch 43 from the lift to the drop position as presently described results in the opening of the above described gate circuits and simultaneously providing for closing of power circuits to the gates of the drop rectifiers 52 and 53 such that the energy stored in the capacitors 48 and 50 are discharged or dumped through the controlled rectifiers 46 and 47 to rapidly and positively commutate such rectifiers off. The movement of the switch 43 to disengage contacts 55 opens the gate circuit for controlled rectifier 46 and the movement to the drop position closes the crop contacts 56. The gate lead 68 of the controlled rectifier 52 is connected to the contacts 56, the opposite sides of which are connected in common with contacts 55 to the normally closed contacts 60-1 of the relay 60. As previously noted, the contacts 60-1 are connected in series with the contact 61-1 directly to the positive side of the power lines 45 through the dropping resistor 63 and the interconnecting line 64. Thus the movement of the lift-drop switch 43 to drop position provides a direct turn on signal to the controlled rectifier 52 thereby permitting the capacitor 48 to discharge in the reverse direction through the controlled rectifier 46 to positively turn the controlled rectifier 46 off.

Simultaneously, the opening of the contact 58 and the closing of the contact 59 of switch 43 provide for a similar dumping of the capacitor 50. Thus, the gate lead 69 of the controlled rectifier 53 is connected in series with a gate resistor 70 and the normally open drop contacts 59 to a set of normally closed contacts 60-3 of the relay 60. The contacts 60-3 in turn are connected to a set of normally closed contacts 61-3 of the relay 61, the opposite side of which is connected via a lead 71 directly to the anode of the controlled rectifier 53. Thus, the gate lead 69 and therefore the gate are connected to the anode of the controlled rectifier and bias the rectifier 53 on. This permits the charged capacitor 50 to dump through the commutating controlled rectifier 53 and the previously conducting controlled rectifier 47 to positively commutate the rectifier 47 off and terminate the lifting current circuit.

The opening of the lifting current circuit through the magnet 41 will, of course, result in the usual transient signal developed within the lifting magnet as a result of its high inductance. The polarity is opposite that as a result of the positive supply and this energy is provided with a discharge diode path back to the supply, generally in the same manner as shown in FIG. 1. In the illustrated embodiment of the invention, the transient current is sensed however and controls the relays 60 and 61. A sensing resistor 72 has one side connected to the lifting magnet 41 which is positive upon opening of the lifting current. The resistor 72 is connected in series with a blocking diode 73 to the positive side of the supply lines 45. A diode 74 in series with a sensing resistor 75 is similarly connected to conduct from the negative side of the power supply lines 45 to the opposite side of the lifting magnet 41. Thus, when the lifting current circuit is open the energy stored in the lifting magnet may discharge through the resistor 72, the diode 73, the supply via the lines 45, the diode 74 and the sensing resistor 75 back to the magnet 41. The voltages developed across the sensing resistors 72 and 75 are similarly applied one each to a pair of current control sensing relays 76 and 77 which are similarly connected across the respective sensing resistors. The relays 76 and 77 are in turn connected to control the actuation of the reversing control circuit 44 and thereby control and sequentially actuate the relays 60 and 61 to provide a controlled drop energization of the lifting magnet 41.

The illustrated relay 76 includes a winding 78 connected in series with a resistor 79 directly across the sensing resistor 72. A Zener diode 80 is connected in parallel with the relay 78 to limit the voltage applied to the relay windings 78 and also provide a reverse polarity by-pass current path. Thus, the Zener is polarized with the cathode connected to the relative positive side of the sensing resistor 72 when it is conducting the transient current as previously described. The anode is connected to the opposite side of the relay. When the transient current flows through the resistor 72 it simultaneously supplies a corresponding voltage across the relay 78 which is then energized to close a set of related contacts 76-1 in the sensing and sequencing circuit 44.

The relay 77 similarly includes a winding connected across the sensing resistor 75 to be energized by the sensing of the voltage established by the transient current to close a set of related normally open contacts 77-1 connected in series with the normally open contacts 76-1 in the circuit 44.

A manually actuated switch 81 is also connected in the series circuit connection of the contacts 76-1 and 77-1. If the switch 81 is opened, the input to the control or reversing circuit is disabled and no reverse current will flow through the lifting magnet 41. The circuit will then essentially operate in the same manner as that described with respect to FIG. 1. When the reversing switch 81 is closed, power is supplied to the reversing control circuit 44 and particularly through a triggering circuit including the switch contacts 76-1 and 77-1.

The energization or actuation of the relay 60 results in a reversing of the position of the contacts of the relay and the energization of a pair of reverse current controlled rectifiers 82 and 83 connected in series with the lifting magnet 41 to conduct a reverse current. Thus the controlled rectifier 82 is connected between the positive side of the power supply lines 45 and the lifting magnet 41 to carry a reverse current to the lifting magnet, the opposite side of which is connected to the negative side of the power supply line 45 by the controlled rectifier 83.

The controlled rectifier 82 has a gate lead 84 connected to a set of normally open contacts 60-4 of the relay 60. The contacts 60-4 have an output pole common with the normally closed contacts 60-1 such that when the relay 60 is actuated, the contacts 60-1 open and contacts 60-4 close. Contacts 60-4 are connected in series with the contacts 61-1 of the relay 61. The contacts 61-1 in turn are connected through and in series with resistor 63 and lead 64 to the positive side of the power lines 45. Thus when the relay 60 is actuated power is supplied directly to the gate of the controlled rectifier 82 and it conducts providing a positive power supply connection to the reverse side of the lifting magnet 41. A gate lead 85 to the controlled rectifier 83 is similarly connected in series with the resistor 86 to a set of normally open contacts 60-5 of the relay 60. The contacts 60-5 are connected in series with a set of normally closed contacts 61-4 of the relay 61 to lead 87 which in turn is connected directly to the anode of the controlled rectifier 83. Thus the gate of the rectifier 83 is connected to the anode, which in turn is at a relatively positive potential with respect to the cathode, thereby driving the rectifier 83 on simultaneously with the driving of the controlled rectifier 82 on.

As shown in FIG. 2 the controlled rectifier 82 in series with the controlled rectifier 47 is connected directly across the power lines 45. Similarly, the controlled rectifier 46 in series with the controlled rectifier 83 is connected directly across the power line 45. Thus it is absolutely essential that these series connected controlled rectifiers are not simultaneously energized under any operating condition. The sequencing and reversing circuit 44 provides a positive means to sequence to sense the condition of the current in circuit to positively prevent the simultaneous gating of the series connected control rectifiers on. This is absolutely essential particularly with relatively large lifting magnets a relatively high power current or high level current is required. This in turn requires high current and therefore expensive controlled rectifiers. If the sequencing control is not provided there is a danger of the simultaneous on bias, with the resulting destruction of the controlled rectifiers. This will not only disrupt the operation and result in a substantial down time but the destruction of relatively expensive components of the control circuitry. The reverse current control of the present invention prevents the possibility of simultaneous turn on of the series connected controlled rectifiers.

The reversing control circuit 45 is driven from the power supply lines 45 with a regulated voltage supply which is schematically shown including a conventional regulating means including a series resistor and parallel Zener circuit 88.

The reversing control circuit 44 includes a pair of transistors 89 and 90 connected in a triggered bistable flip-flop circuit for controlling the energization of a winding 91 of the relay 60. The flip-flop circuit of the transistors 89 and 90 is connected with the transistor 90 normally conducting by positively driving transistor 89 off, as follows.

A resistor 92 in series with a capacitor 93 is connected to the base or input circuit of a control transistor 94. The collector or emitter circuit of transistor 94 is connected on the negative side of the power supply. Thus current will flow through the turn on circuit of the transistor 94 until the capacitor 93 charges to the supply voltage. Thus, when first connected, the transistor 94 conducts and positively holds the base of the transistor 89 to ground, permitting the turn on current to be applied to transistor 90.

A current is supplied through the relay winding 91 in parallel with a resistor 95 to a turn on bias circuit for the transistor 90. The turn on bias circuit in particular includes a capacitor 96 in parallel with a resistor 97 and in series with a resistor 98 to the negative side of the power supply. The transistor 90 has it base connected to the junction of the resistor 98 and the parallel resistor 97 and capacitor 96. The emitter of the transistor 90 is connected through a common emitter resistor 99 to the negative power supply. Thus, with the transistor 89 positively held off, current flows through the bias circuit for the transistor 90 turning the transistor 90 on. It should be noted that the resistor 95 insures that the current through this circuit and particularly winding 91 is below the level sufficient to operate the relay 60. Thus the current through the winding 91 is insufficient to pull in the associated contacts and the relay 60 remains in the stand-by position illustrated.

The transistor 90 has its collector connected to the positive power supply through the collector resistor 100. A turn on circuit for the transistor 89 is connected between the collector of the transistor 90 and the negative power supply line and includes a voltage dividing network including a resistor 101 in series with a resistor 102, with the base of transistor 89 connected to the junction of such two series connected resistors in accordance with the usual flip-flop circuit construction. The state of the transistors 89 and 90 is reversed by a pulse signal established in response to simultaneous closing of the contacts 76-1 and 77-1 as the result of the reverse current flow in the discharging circuit as a result of the transient current of the lifting magnet 41, as presently described. This insures that the transient current flow is established and consequently positively insures that the main lifting control rectifiers 46 and 47 are in the off condition.

The series connected contacts 76-1 and 77-1 interconnect the negative side of the power supply to a series circuit including a diode 103 and a capacitor 104 to the collector of the transistor 89, and thus to the input or bias circuit for the transistor 90. When the manual switch 81 and the contacts 76-1 and 77-1 are closed, they ground the capacitor and thereby produce a negative pulse at the collector of the transistor 89 and at the input to the bias network for the transistor 90. As a result the transistor 90 will be driven off. As a result the collector of the transistor 90 will rise to a positive level providing a positive voltage signal through the voltage dividing network of resistors 101 and 102, and thereby drive the base of the transistor 89 positive, turning on the transistor 89. Once initiated, the action continues through the usual regenerative circuit operation to positively turn the transistor 89 on and turn the transistor 90 off.

With the transistor 89 turned on, current flow through the winding 91 in parallel with the resistor 95 rises to a level to actuate the relay 60 to move its contacts to the alternate position thereby supplying current to the reverse current control rectifiers 82 and 83. At the instant that the control rectifiers 82 and 83 are forward biased and conduct the reverse current through the magnet 41 the sensing current through the resistors 72 and 75 drops to release the relays 76 and 77 with the resulting opening of the related contacts 76-1 and 77-1. Capacitor 104 discharges through a pair of resistors 105 and 106 connected between the opposite sides of the capacitor and the power line and reset the triggering circuit.

The circuit is then in a condition conducting a reverse current which will rise at a time constant approximately equal to the ratio of the magnetic conductance and the series resistance current path. The magnitude of the reverse current is therefore controlled by controlling the time that the transistors 82 and 83 are maintained conducting.

Thus, with the relay 60 energized and the relay 61 deenergized as just described the reverse current circuit is established through the controlled rectifiers 82 and 83. Simultaneously, the capacitors 48 and 50 are charged with a reverse current and thus with an opposite polarity from that previously described. Thus, the capacitor 48 has the negatively charged side connected to the anode of the controlled rectifier 83. The capacitor 50 in turn has its positive side connected to the cathode of the controlled rectifier 82. These capacitors are thus properly connected and employed to commutate the controlled rectifiers 82 and 83 off as hereinafter described as the result of the actuation and energization of the relay 61 a predetermined time after the creation of the reverse current. The time is controlled in the illustrated embodiment by a timing means connected to the supply through the transistor 90, which as previously described is cutoff in response to sensing of the discharging of the energy from magnet 41 through resistors 72 and 75.

With the turn off of the transistor 90, a timing circuit is established to an energizing control circuit for the relay 61 as follows. A voltage dividing network including a pair of resistors 107 and 108 is connected across transistor 90 and particularly between the collector of the transistor 90 and the negative return power supply side. Thus, when the transistor 90 is turned off, a voltage is developed across the resistors 107 and 108. This provides power to a timing network including a potentiometer 109 and a capacitor 110 connected across the resistor 108. The potentiometer 109 includes an adjustable tap 111 to vary the portion of the potentiometer connected in series with the capacitor 110. In the illustrated embodiment of the invention the tap 111 is ganged to the switch 81 such that the adjustment of the potentiometer tap 111 is preceded by the closing of the switch 81. The junction of the tap 111 and the capacitor 110 is connected to the non-inverting terminal of an integrated circuit comparator 112, shown in schematic illustration as it may be any well-known integrated circuit device. The integrated circuit 112 is powered from regulated supply including a resistor 114 in series with a Zener diode 113 connected across the supply. A reference potential is provided to the inverting terminal of the integrated circuit 112. The reference potential is derived from the center of a pair of series connected voltage dividing resistors 115 and 116 connected in parallel with the Zener diode 113. The reference voltage normally holds the output of the integrating circuit at a relatively low level. This level is maintained until the potential at the non-inverting input rises above or to a selected voltage greater than the reference voltage. The voltage at the non-inverting terminal is of course dependent upon the rate of charge of capacitor 110 and thus will occur at a selected time after the previous described switching of the transistors 89 and 90, depending upon the amount of resistance inserted in the circuit by the potentiometer 109. Thus, after a given time period the integrated circuit 112 will rise to a maximum output value. The output value of the integrated circuit is coupled through a Zener diode 117 in series with a base resistor 118 to a transistor 119. The Zener 117 is normally non-conducting. When the voltage rises to the maximum output level of the integrated circuit 112, diode 117 conducts and provides a turn on current to the transistor 119 which has its collector to emitter circuit connected in series with a winding 120 of the relay 61 across the incoming power supply lines. Relay winding 120 is thus energized whenever the transistor 119 is turned on to reverse the position of its contacts.

Simultaneously, the flip-flop circuit of transistors 89 and 90 is reset as follows.

A diode 121 in series with a capacitor 122 is connected between the collector of the transistor 90 and the collector of the transistor 119. Thus when the transistor 119 is turned on it effectively grounds the collector of the transistor 90 which in turn grounds the input across the voltage dividing resistors 101 and 102 which establish the input holding the transistor 89 conducting. As a result the transistor 89 will be turned off. When the resistor 89 turns off the current may flow through the input bias circuit for the transistor 90 and in particular through the parallel capacitor and resistor 97 in series with the resistor 98. The voltage is thus developed across the resistor 98 which is connected between the base and emitter circuit of the resistor 90 to drive the transistor 90 off through a similar regenerative circuit such that the transistor 89 is positively driven off and the transistor 90 is driven on. This in turn opens the circuit to the winding 91 of the relay 60. As previously noted, the resistor 95 in parallel with the winding 91 ensures the leakage current of the transistor 89 and the bias input current to the transistor 90 is insufficient to provide a holding current through the winding 91 of the relay 60. Consequently, the relay 60 reverts to the full line position shown. Simultaneously, the relay 61 moves to the alternate position. The relay 61 is held in during the period transistor 119 conducts. Thus, when transistor 90 is turned on, the charging current to the timing circuit is removed and the circuit resets. Thus, capacitor 110 discharges and the integrated circuit 112 output voltage drops below the Zener voltage of Zener 117.

A capacitor 124 is connected in parallel with the input circuit to the transistor 119 and is thus charged during the period that the transistor 119 is on. The charged capacitor 124 will conduct to maintain the transistor 119 on momentarily. This will ensure the complete energization of the relay 61. The transistor 119 then turns off. The capacitor 122 will then discharge through the resistor 123 and the coil 120 of the relay 61, resetting the circuit.

Energization of the relay 61 opens the gate circuits to the controlled rectifiers 82 and 83 and provides input power to a pair of reverse commutating controlled rectifiers 125 and 126. In particular, the controlled rectifier 125 is connected in parallel with the controlled rectifier 82 and the commutating capacitor 50. Further, the controlled rectifier 125 is polarized to conduct the reverse current from the reverse charged capacitor 50 to turn off or commutate the controlled rectifier 82. Similarly, the controlled rectifier 126 is connected in parallel with capacitor 48 and the controlled rectifier 83 and is polarized to bias or conduct the commutating or turn off current.

The controlled rectifier 125 has its gate connected via a lead 127 with a set of normally open contacts 61-5 of the relay 61 to the power supply resistor 63. Thus the contact 61-5 includes a common pole with the normally closed contact 61-1 of the relay 61 such that the energization of the relay 61 provides power to the contact 61-5 to directly and positively turn on the controlled rectifier 125.

Similarly, the gate of the controlled rectifier 126 is connected via a lead 128 and a resistor 129 to a set of normally open contacts 61-6 of the relay 61. The opposite side of the normally open contact 61-6 is connected via lead 130 connected directly to the anode of rectifier 126. Thus, when the contacts 61-6 close, the anode of controlled rectifier 126 is connected to the gate to provide a turn on signal thereto.

The commutating capacitors 48 and 50 will be dumped through the respective controlled rectifiers 125 and 126 to positively turn off the reverse current control rectifiers 82 and 83.

The rapid termination of the reverse current will result in a transient voltage in the lifting magnet 41 of an opposite polarity from that previously described as the result of the breaking of the lifting current.

In the illustrated embodiment of the invention, such energy is transmitted back to the supply via a pair of reverse diodes 131 and 132. Thus, the diode 131 connects the positive power supply line to the one side of the lifting magnet 41 in series with the resistor 75. Similarly, the diode 132 connects the negative side of the power supply in series with the sensing resistor 72 to the opposite side of the lifting magnet 41. Thus, current will flow from the lifting magnet through the sensing resistor 75 the diode 131, the power supply via the lines 45, the diode 132 and sensing resistor 72 back to the lifting magnet 41, discharging the energy of the reverse transient voltage. The voltage developed across the sensing resistors 72 and 75 is not effective to actuate the relays 76 and 77 as the result of the low conductivity of the forward conducting path of the Zener diodes 80 which are connected in parallel with such relay windings.

The operation of the circuit illustrated in FIG. 2 may be briefly summarized as follows.

When the switch 43 moves to the lift position contacts 55 and 58 are closed providing turn on power to the controlled rectifiers 46 and 47. This establishes the lifting current through the magnet 41 as well as the proper charging of the commutating capacitors 48 and 50 for commutating of the controlled rectifiers 46 and 47 off. Movement of the lift control switch 43 to the drop position opens the circuit through the lift contacts 55 and 58 to deenergize the gate circuit of the rectifiers 46 and 47 and then closes contacts 56 and 59 to provide turn on power to the commutating rectifiers 52 and 53. This provides for the commutation of the controlled rectifiers 46 and 47 by dumping or discharging of the energy of the capacitors 48 and 50 therethrough. If the controlled rectifiers 46 and 47 are turned off, the positive lifting current through the lifting magnet 41 is removed. The lifting magnet 41 as a result of high inductance maintains current flow which is applied to the sensing resistors 72 and 75. If only one of the rectifiers 46 or 47 is not off, the transient voltage is applied directly to the supply via that rectifier and by-passes the corresponding sensing resistor. If both rectifiers 46 and 47 are commutated off, the relays 76 and 77 are correspondingly energized to indicate that both of the control rectifiers have been commutated off. If either or both of them are not commutated off at least one of the contacts 76-1 and/or 77-1 will be opened preventing the signalling of a reverse current circuit for establishing the energization of the reverse current controlled rectifiers 82 and 83. Thus only if both of the controlled rectifiers 46 and 47 are commutated off will the circuit permit the reverse current circuit and thereby positively prevent the simultaneous reverse current circuitry.

Assuming proper commutation of controlled rectifiers 46 and 47, the relay 60 is energized to turn on controlled rectifiers 82 and 83 and thereby providing a reverse current through the lifting magnet 41 and the simultaneous reverse charging of the commutating capacitors 48 and 50, which were similarly charged by the magnet discharge current.

Simultaneously, the capacitor 110 is charged in the reverse control circuit and after a predetermined time fires the integrated circuit 112 to provide a turn on signal to the control transistor 119 which resets the flipflop circuit to remove the timing signal and simultaneously energizes the relay 61. The resetting of the flipflop circuit deenergizes the relay 60 thereby opening the circuits of the reverse current controlled rectifiers 82 and 83. Simultaneously, the energization of the relay 61 provides power to the gates of the reverse commutating controlled rectifiers 125 and 126 thereby discharging the capacitors 48 and 50 through the control rectifiers 82 and 83 to commutate and positively turn off such control rectifiers. The opening of the reverse current path with a resulting opposite polarity transient, discharges the induction energy of magnet 41 through the supply circuit and particularly the diodes 131 and 132 in series with the sensing resistors 75 and 72. As previously noted, however, the current is bypassed from the relays 76 and 77 to prevent energization thereof and consequently the circuit returns to the normal standby position even if the switch is left in the drop position.

The setting of the relay 61 opens the circuit to the contacts 56 and 59 thereby removing power from the gates of the controlled rectifiers 52 and 53. This in turn positively prevents the short circuiting of the supply through the series connection of the controlled rectifiers 52 in series with the controlled rectifier 126 and/or controlled rectifier 125 in series with controlled rectifier 53.

The present invention thus provides a reliable control system for controlling the bidirectional current through a lifting magnet to permit the accurate energization and dropping of a load.

Further, the sensing resistors 72 and 75 in the illustrated embodiment of the invention are power dissipating elements. If desired, other means of sensing the transient circuit conditions may be employed. For example, it may be possible to analyze the voltage condition in the transient circuit and particularly the voltage appearing across the diodes 73 and 74 in order to detect the reverse circuit transient condition to thereby control the switching. Thus, within the broadest aspect of the present invention the switching is controlled by a sensing and sequencing means which first establishes that the transient discharge circuit has been established and thereby insures that the forward current circuit has been opened as the result of the disconnect of the main forward control rectifiers. This sensed condition then controls the actual switching for establishment of the reverse current circuit.

Further, the time that the reverse current is maintained is in turn controlled by a fixed timing cycle in the illustrated embodiment of the invention dependent upon the time constant of the resistor 109 and the capacitor 110. As this is a fixed time, the reverse current amplitude may vary with load. Thus, with a lifting magnet and the like the inductance of the lifting magnet may be directly affected by the load and in particular by variation in the size or the magnetic characteristic of the load material and the like. If such variation is undesirable or incompatible with any particular use, the reverse current can of course be detected, with the reverse current cutoff at a given detected current level. The illustrated fixed time system provides a relatively simple and inexpensive means for controlling the reverse current for many applications.

The present invention thus provides a simple reliable and inexpensive control circuit for connecting and disconnecting of a direct current power supply from a highly inductive load and in particular provides for control of reverse current through the load in a novel simple manner. This system is particularly adapted to a solid state triggered control with the sensing and sequencing control circuit positively protecting or providing maximum protection against damaging of the relatively expensive power component of the main circuit as the result of malfunctioning of one or more of the other circuit components.

Applicant has found that the present invention provides a highly improved means of rapidly switching an inductive load on and off while minimizing the destructive internal stresses within the lifting magnet structure.

Various modes of carrying out the invention are contemplated as being within the scope of the following claims which particularly point out and distinctly claim the subject matter which is regarded as the invention.

I claim:

1. An operating circuit for a high-inductive load, comprising a direct current source, a pair of controlled rectifier means connected to the opposite sides of the current source and defining a positive and a negative direct current out-put connection means, a lifting magnet connected to said output connection means, said rectifier means having a gate means and an anode means, a start switch connecting the gate means to the corresponding anode means to establish a turn-on current to the gate means upon closing of the start switch, commutating circuit means for each of said rectifier means including a capacitor storage means and a resistance means connected in series with said output connection means and in parallel connection to the lifting magnet and a commutating controlled rectifier means connected across said corresponding firstnamed rectifier means and the storage means, a stop switch connecting the anode means to the gate means of said commutating controlled rectifier means, and means connected to the output connection means for discharging of an induced load voltage.

2. A direct current operating circuit for a high-inductive direct current load wherein inductive energy is stored in the load, comprising a pair of direct current input power leads for establishing a direct current energization of a load for an indeterminate time, first load switch means connected to said leads and the opposite sides of the load and defining a forward direct current connection means, a second reverse load switch means connected to said leads and the opposite sides of the load and defining a reverse direct current connection means, a transient load energy discharge path means including unidirectional feedback means connected to the load for discharging of an induced load voltage into said source, and selectively actuated control means connected to said discharge means and including reversing switch means connected to actuate said reverse load switch means only in response to completion of said discharge path means to both sides of said load.

3. The operating circuit of claim 2 wherein said forward and reverse load switch means are triggered unidirectional conducting means, and common commutating means are connected to the first and second load switch means to the corresponding side of the load, and said commutating means including triggered commutating switch means connected to said control means for establishing a timed energization of said commutating switch means.

4. The operating circuit of claim 2 wherein said control means includes means to detect the presence of a self-induced current in a by-pass circuit in parallel with said first load switch means.

5. The operating circuit of claim 2 wherein said first switch means includes a pair of controlled rectifiers connected one each to opposite sides of the load and correspondingly polarized to carry forward current through a load,
- said second switch means includes a pair of controlled rectifiers connected one each to opposite sides of the load and correspondingly polarized to conduct a reverse current through the load,
- a first commutating means connected in common to a first controlled rectifier of the first and second switch means, and
- a second commutating means connected in common to the second of the controlled rectifiers of the first and second switch means.

6. The operating circuit of claim 12 wherein said first and second load switch means being unidirectional conducting means, commutating means to turn off said load switch means,
- said control means includes a first switch means having a forward current position connected to provide power to the first load switch means and a second position to provide power to the commutating means and the second load switch means, and
- a first relay means connected to such switch means and responsive to actuation to remove power from the commutating means and transfer the power to the second load switch means, and
- said control means including forward current cutoff sensing means connected to the load and responsive to a self induced load current in response to opening of said first load switch means to actuate said relay means and thereby turn on said second load switch means.

7. The operating circuit of claim 16, including a second relay means having contacts connected to the contacts of the first relay means and operable to open said second load switch means and to simultaneously actuate said commutating means, and
- stop means to energize said second relay means to thereby terminate the said reverse current in time spaced relation to the energization of said first relay means.

8. The operating circuit of claim 6 wherein said forward current cutoff sensing means includes a discharge circuit including diode means interconnected between the load and the supply to discharge the inductive energy in the load back to the supply, and
- said discharge circuit including signal means establishing a signal in accordance with a preselected discharging current.

9. The operating circuit of claim 8 wherein said signal means includes a pair of resistors connected one each to the opposite sides of the load and in series with said diodes whereby each resistor establishes a signal directly related to the current to and from said load.

10. The operating circuit of claim 9 having interlock relay means connected in parallel with said resistors and having corresponding series connected interlock contacts, and
- said first relay means being connected in an energizing circuit controlled by said series connected contacts.

11. The operating circuit of claim 8 wherein said first relay means is connected in an energizing circuit including a flip-flop circuit having a normally non-conducting transistor connected in series with the first relay means to the power supply and an alternate normally conducting transistor,
- said signal means having relay switches connected to opposite sides of the load and energized by the discharging current,
- a capacitive pulsing network connected to the power supply through said relay switches in series and connected to apply a switching pulse to said flip-flop circuit to reverse the conducting state of the first and second transistors and to thereby energize the first relay means and cutoff the circuit of the second normally conducting transistor.

12. The operating circuit of claim 11 wherein said stop means for said second relay means includes
- a timing network connected to the output of the normally conducting transistor and held off during the period of conduction, said timing network initiating a timing period upon turn-off of the normally conducting transistor, and
- said second relay means being controlled by said timing network to reset said first relay means and energize said second relay means.

13. The operating circuit of claim 12 wherein said timing network includes a timing means to establish a progressively increasing potential signal,
- a comparator circuit having a reference potential input and a switching input connected to said potential means to produce an output signal in response to a selected potential,
- said comparator being connected to energize said second relay means and to simultaneously reset said flip-flop circuit to deenergize said first relay means, and
- second timing means holding said second relay means energized for a predetermined time.

14. The operating circuit of claim 2 wherein said first switch means includes a pair of gated unidirectional conductors connected one each to opposite sides of the load and polarized to conduct forward current through the load,
- said second switch means includes a pair of gated unidirectional conductors connected one each to opposite sides of the load and polarized to conduct the reverse current through the load,
- a first commutating capacitor connected in series with a resistance means across said load with one side of the capacitor connected in common to a first conductor of the first and second switch means,
- a second commutating capacitor connected in series with a resistance means across said load with the capacitor connected to the common connection between the second of the conductors of the first and second switch means, a first commutating gated unidirectional conductor connected in parallel with the first conductors of the first switch means and the capacitor in series and correspondingly polarized, a second commutating gated unidirectional conductor connected in parallel with the second conductors of the first switch means in series with the second commutating capacitor, a third commutating gated unidirectional conductor connected in parallel with the first conductor of the second switch means in series with the first commutating capacitor, a fourth gated unidirectional conductor connected in parallel with the second conductor of the second switch means in series with the second commutating capacitor, and said control means selectively gating the gated conductors with means responsive to the deenergization of the first switch means to gate the first and second commutating conductors and means responsive to deactivating of the second switch means to gate the third and fourth commutating conductors.

15. The operating circuit of claim 14 wherein said control means includes a selection switch means having a first position connected to provide power to the conductors of the first switch means and a second position connected to provide power to the first and second commutating conductors, a first relay means connected to such selection switch means and responsive to actuation to remove power from the switch means and transfer the power to the reverse current gated conductors of the second switch means, sensing means connected in circuit with and responsive to an induced load current to actuate said relay means and thereby turn on such reverse current controlled rectifiers, a second relay means having contacts connected to the contacts of the first relay means and operable to remove open the power circuit to said reverse current control rectifiers and to simultaneously supply power to the third and fourth commutating gated unidirectional conductor, and means responsive to energization of the said first relay to actuate said second relay to thereby terminate the said reverse current, and means to discharge the energy of the load resulting from the reverse current.

16. The operating circuit of claim 15 wherein said forward current cutoff sensing means includes diode means interconnected between the load and the supply to discharge the inductive energy in the load back to the supply, and said sensing circuit including means establishing a signal in accordance with a preselected discharging current, said signal means including a pair of resistors connected one each to the opposite sides of the load and in series with said diodes whereby each resistor establishes a signal directly related to the current to and from said load, relay means connected in parallel with said resistors and having corresponding series connected contacts, said first relay means being connected in an energizing circuit controlled by said series connected contacts, said first relay energizing circuit including a flip-flop circuit having a normally non-conducting transistor connected in series with the relay to the power supply and an alternate normally conducting transistor, a capacitive pulsing network connected to the power supply through said series connected switches and connected to apply a switching pulse to said flip-flop circuit to reverse the conducting state of the first and second transistors to thereby energize the first relay means and cutoff the circuit of the second normally conducting transistor, a timing network connected to the output of the normally conducting transistor and held off during the period of conduction, said timing network initiating a timing period upon turn-off of the normally conducting transistor, a comparator circuit having a reference potential input and a switching input connected to said timing network to produce an output signal in response to the output of the timing circuit after a predetermined time, said comparator being connected to energize said second relay means and to simultaneously reset said flip-flop circuit to deenergize said first relay means, and second timing means holding said second relay means energized for a predetermined time.

17. An operating circuit for a high-inductive load wherein inductive energy is stored in the load, comprising a direct current power source having a positive output means and a negative output means, a first pair of unidirectional rectifier means connected to the opposite sides of the load and to the direct current power source to provide a forward current through the load, a second pair of unidirectional rectifier means connected to the opposite sides of the load and said power source to provide a reverse current path through said load, a first and second commutating capacitor connected in parallel with said load and being forward and reverse charged in accordance with the presence of said forward and reverse currents, and commutating controlled switch means connected one each to each of said forward and reverse rectifier means with each of said commutating capacitors being connected to a forward and a reverse rectifier means and the associated commutating switch whereby each capacitor functions to commutate both a forward and a reverse current switch.

18. An operating circuit for a high-inductive load wherein inductive energy is stored in the load, comprising a pair of input power leads, first load switch means connected to said leads and the opposite sides of the load and defining a forward direct current connection means, a second reverse load switch means connected to said leads and the opposite sides of the load and defining a reverse direct current connection means, a transient load energy discharge path means including unidirectional feedback means connected to the load for discharging of an induced load voltage into said source, and control means connected to said discharge means and including reversing switch means connected to actuate said reverse load switch means only in response to completion of said discharge path means to both sides of said load.

19. An operating circuit for a high-inductive load wherein inductive energy is stored load, the load comprising
- a direct current power source having a positive output means and a negative output means,
- a first unidirectional controlled rectifier means connected to the one side of the load and to the direct current power source to provide a forward direct current through the load,
- a second unidirectional rectifier controlled means connected to the opposite sides of the load and said power source to provide a reverse direct current path through said load,
- a commutating capacitor connected in parallel with said load and being forward and reverse charged in accordance with the presence of said forward and reverse currents, and
- commutating controlled switch means connected to said forward and reverse rectifier means with said commutating capacitors being connected to both said forward and reverse controlled rectifier means and the associated commutating switch means whereby said capacitor functions to commutate both a forward and a reverse direct current controlled rectifier means.

* * * * *

UNITED STATES PATENT OFFICE
CERTIFICATE OF CORRECTION

Patent No. 3,708,685          Dated January 2, 1973

Inventor(s) Joseph G. Miller, John H. Stichman and Theodore Bernstein

It is certified that error appears in the above-identified patent and that said Letters Patent are hereby corrected as shown below:

Column 19, Line 25, CLAIM 6     cancel "12" and insert ---- 2 ----;

Column 19, Line 46, CLAIM 7     cancel "16" and insert ---- 6 ----;

Column 23, Line 9, CLAIM 19     after "stored" cancel "load," and insert ---- in ----; and before "com-" insert ---- a comma (,) ---.

Signed and sealed this 29th day of May 1973.

(SEAL)
Attest:

EDWARD M. FLETCHER, JR.
Attesting Officer

ROBERT GOTTSCHALK
Commissioner of Patents